March 22, 1955 — W. VUTZ ET AL — 2,704,670
REMOVABLE MANURE SPREADER DISTRIBUTOR
Filed Jan. 25, 1950 — 2 Sheets-Sheet 1

INVENTORS
WILHELM VUTZ
MERLE PETERSON
BY
Alden D. Redfield
ATTORNEY.

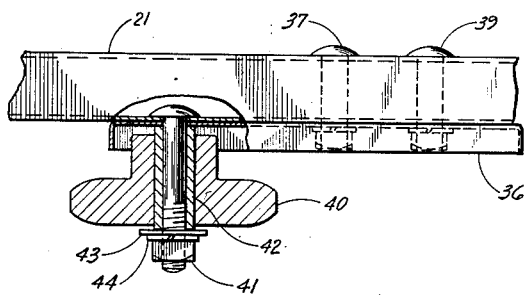
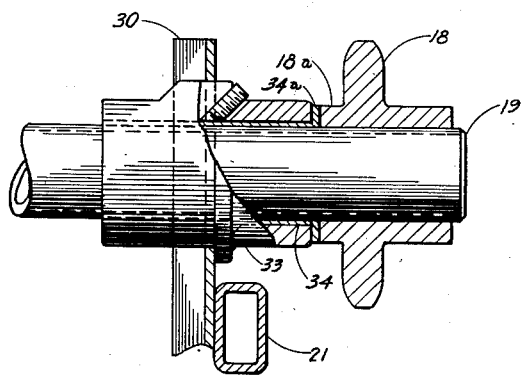
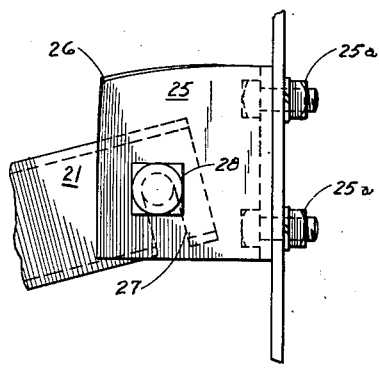

United States Patent Office 2,704,670
Patented Mar. 22, 1955

2,704,670

REMOVABLE MANURE SPREADER DISTRIBUTOR

Wilhelm Vutz and Merle Peterson, Coldwater, Ohio, assignors to Avco Manufacturing Corporation, Cincinnati, Ohio, a corporation of Delaware Application January 25, 1950, Serial No. 140,428

1 Claim. (Cl. 275—6)

The present invention relates to an improvement in manure spreaders and has particular reference to a removable manure spreader distributor.

Manure spreaders have found great favor with farmers for many years and are particularly useful for distributing manure, compost, lime, marl and other similar materials uniformly over a field. The conventional manure spreader consists of a wagon box in the bottom of which is an intermittently driven, rearwardly traveling endless conveyor whereby the load of material to be spread is fed toward the rear end of the box which is open for the most part. Two horizontal pulverizer cylinders are rotatably supported adjacent the rear end of the box with their axes of rotation transversely disposed to the length of the box. One pulverizer cylinder of relatively large diameter is mounted close to the bottom surface of the box and during its rotation engages the major portion of the material being advanced by the conveyor. The second pulverizer cylinder, which aids in leveling the load at the rear of the box, is relatively smaller in diameter and is positioned slightly above and forward of the lower cylinder. These cylinders not only tear the load to shreds as it is advanced by the moving conveyor but also throw the shredded material on to a rotating horizontal distributor which is located to the rear of and slightly above the lower pulverizer. The axis of rotation of the distributor is also transverse of the wagon box.

The principal function of the distributor is to scatter or broadcast the material on the ground uniformly. As stated, the material is thrown onto the distributor, the speed and direction of rotation as well as the size and location of the pulverizers being taken into consideration so that the paths taken by the material thrown by the respective pulverizers will converge near the distributor shaft. A plurality of blades is attached to the distributor shaft for conjoint rotation therewith, each distributor blade having a contour more or less approximating an involute in shape.

The shredded material impinges on the rotating distributor blades which, through a combination of centrifugal and other forces, fling the shredded material laterally and rearwardly, thereby covering uniformly a relatively large area considerably wider in extent than the length of the manure distributor itself.

It is an object of the present invention to provide a removable distributor support to permit the manure spreader with which it is associated to be used for other purposes than the spreading and distributing of manure. It is noteworthy that the invention may be used to advantage with either power driven or ground driven spreaders.

A particular advantage of a manure spreader, made according to the teachings of the present invention, is that the spreader may also be used for transporting and unloading ensilage and similar products after removal of the distributor and its support. When used in this fashion, the conventional mechanism remaining on the manure spreader after the distributor support has been removed, is well adapted to the unloading of these products.

Another object of the present invention is the provision of a distributor supporting structure which may be quickly and easily attached and detached at the rear of a manure spreader.

A still further object of the present invention is the provision of a removable distributor supporting structure which is not only extremely rugged in construction but also simple and economical to manufacture. An advantage of the herein disclosed novel structure is that it makes possible additional applications for manure spreaders without necessitating any sacrifice in quality or performance of the spreader when used in a conventional manner for broadcasting shredded materials.

Another advantage of the invention is that the distributor may be removed without disturbing the adjustment or assembly of the conveyor or pulverizer cylinder drive mechanism. This is obviously highly desirable and facilitates the practical use of the device.

A further object of the present invention is the provision of a manure spreader having a removable distributor which, after its removal, leaves the spreader ready for use in transporting ensilage and other products. Since the pulverizer cylinders remain intact at the rear of the wagon box, an obstruction or barrier remains after the removal of the distributor which is sufficient to prevent loss of ensilage through the opening at the rear wall of the wagon box.

It is also an advantage of the present invention that the distributor may be easily attached and detached without disconnection of the tractor or other motive means from the manure spreader proper and that the spreader need not be maneuvered in order to make possible the connection of the distributor.

The novel features that are considered characteristic of the invention are set forth in the appended claim; the invention itself, however, both as to its organization and use, together with additional objects and advantages thereof, will best be understood from the following description of a specific embodiment when read in conjunction with the accompanying drawings, in which:

Figure 3 is a view taken on plane 3—3 of Figure 1 showing a partial longitudinal sectional view of the distributor drive chain idler sprocket and its supporting structure;

Figure 4 is a view taken on plane 4—4 of Figure 2 showing a partial longitudinal sectional view of one of the supporting bearings of the distributor and the distributor drive sprocket; and Figure 5 is a view, drawn to an enlarged scale, of a clamping bracket for the distributor support.

Figure 1:
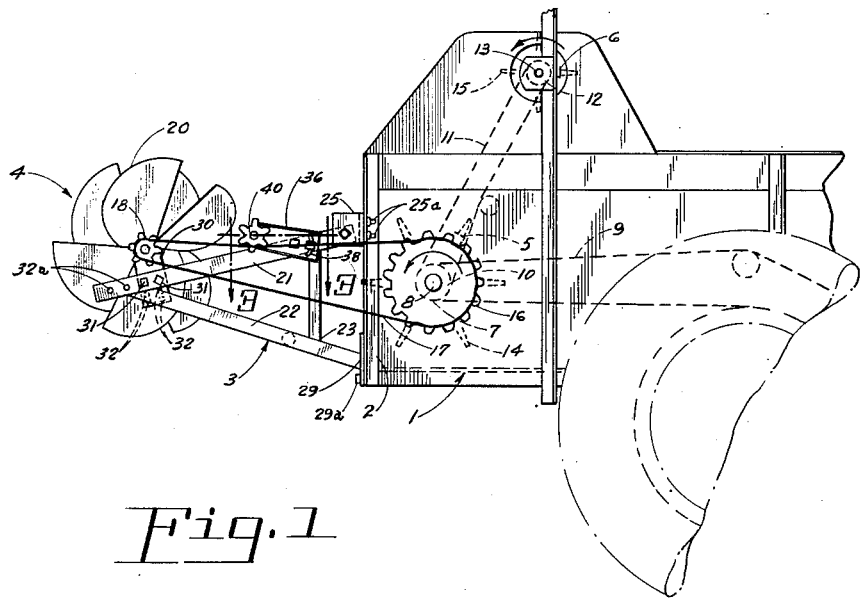
Figure 1 shows a side elevational view of the rear portion of a manure spreader provided with the novel removable manure distributor.
Figure 2:
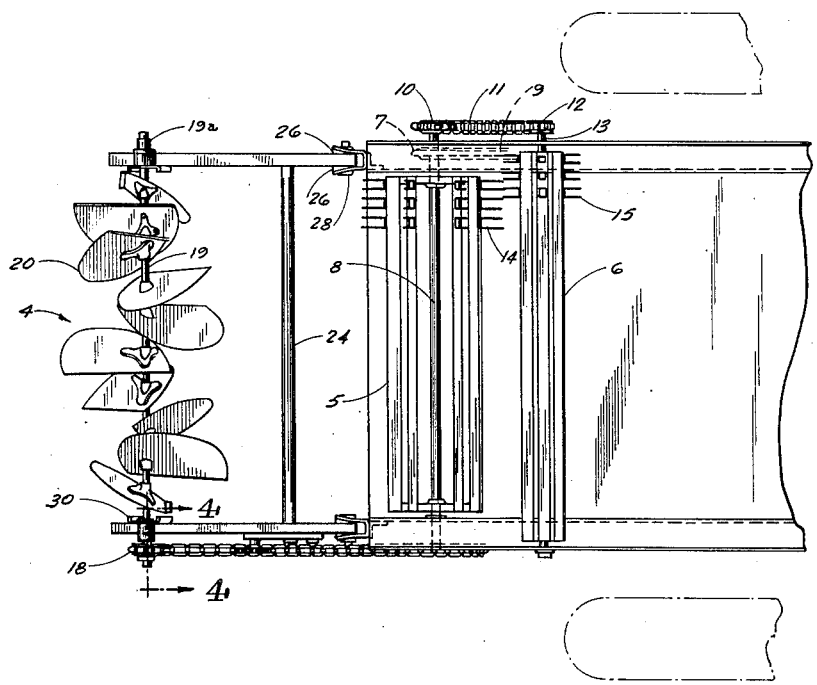
Figure 2 is a top plan view of the rear portion of the spreader showing the lateral disposition of components of the present invention and associated mechanism of the manure spreader.

As shown in the associated figures, the present invention is associated with the open rear end of a manure spreader wagon box, generally designated 1, having terminating structural supports 2. A removable distributor supporting framework, generally designated 3, is attached to supports 2 by means to be described more fully hereinafter. The supporting framework projects rearwardly from the rear of the spreader and supports for high speed rotation a manure distributor, generally designated 4, to which shredded manure or similar materials are fed by lower and upper pulverizer cylinders 5 and 6, respectively.

Pulverizer cylinder 5 is the main cylinder for supplying material to the distributor and engages and shreds the material as it is supplied thereto by an endless rearwardly moving conveyor (not shown) disposed at the bottom of manure spreader box 1. The upper rotary pulverizer cylinder 6 also shreds and feeds a certain amount of material to the distributor assembly but functions primarily to level rearwardly moved portions of the load to be spread and helps eliminate large and unwieldly clumps of material.

Lower cylinder 5 is driven by sprocket 7 fixedly secured to its shaft 8 which is supported for rotation by the side walls of the manure spreader box. In ground driven spreaders, drive chain 9 engages sprocket 7 and is driven by another engaged sprocket (not shown) secured for conjoint rotation with the main axle of the manure spreader in a manner well known in the art. In power driven spreaders, shaft 8 is driven from the power take off connection of a tractor independently of the ground wheels by means not shown.

A second sprocket 10 is fixedly secured to shaft 8 and drives a chain 11 engaged with a sprocket 12 secured to shaft 13 of the upper pulverizer cylinder. Shaft 13 is also supported for rotation about a fixed axis by the side walls of the manure spreader box.

A plurality of radially extending shredder teeth 14 and 15 are rigidly secured to the lower and upper pulverizer cylinders, respectively. These teeth are driven in the directions indicated in Figure 1, and shred and feed the load to distributor 4 which is driven at high speed by a driving sprocket 16, secured to shaft 8, and a driven chain 17. Chain 17 is engaged with a sprocket 18, which is pinned to one end of a hollow distributor shaft 19 to which is secured a plurality of curved and angularly disposed distributor blades 20.

It will be apparent from the foregoing disclosure that, whenever the pulverizer cylinders are in rotation, the distributor is likewise in rotation and that the distributor assembly spreads both laterally and rearwardly shredded material supplied thereto by the action of the pulverizer cylinders.

In accordance with the teachings of the present invention, the distributor supporting framework comprises a pair of rigid A frames in parallel disposition at the rear of the manure spreader box. Each A frame incorporates a downwardly inclined tubular structural member 21 to which is welded at its outer end an upwardly inclined tubular member 22. Structural braces 23 are welded at their ends to members 21 and 22 and with transverse strengthening member 24 create a laterally and vertically rigid structure of light weight. The structural members may be made from a wide variety of materials but preferably are made from tubing of rectangular cross section, this tubing lending itself readily to mass production methods and having a very high strength to weight ratio.

A pair of clamping brackets 25 are secured to the rear structural supports 2 of the manure spreader in any conventional manner, as by bolts 25a. These brackets are formed with a more or less U-shaped horizontal section and have their upper and outwardly extending corners spread laterally to form guide surfaces 26 to facilitate the introduction therebetween of the projecting ends of structural members 21, each of which is formed to define an open slot 27 suitably proportioned for intimate engagement with bolts 28 which are supported and positioned by the clamping bracket 25. See Figure 5.

The lower ends of the structural members 22 are welded or otherwise secured to mounting plates 29 which are positioned in such a fashion, relative to the structural members, that they are coplanar and held in mating contact with the rear faces of the supports 2 by bolts 29a.

It will be apparent to those skilled in the art that the distributor supporting framework may be easily and quickly secured to or removed from the manure spreader box merely by the tightening or loosening of bolts 28 and inserting or removing bolts 29a, no other operation being necessary. Whenever the distributor framework is attached or detached, chain 17 is engaged or disengaged, respectively, with sprocket 18 of the distributor assembly. The material from which clamping brackets 25 are fabricated is resilient and facilitates the clamping of members 21 by the clamping brackets as bolts 28 are tightened. When the bolts are loosened, the clamping brackets spring apart and release members 21.

Distributor 4 is rotatably secured to the distributor supporting framework by a pair of rigidly attached brackets 30, having more or less shallow U-shaped cross sections. These brackets position and support bearing housings 33 which are fitted with bushings 34. Bushings 34 rotatably support hollow shaft 19 and are provided with thrust faces 34a. A thrust face 18a, formed on sprocket 18, and a thrust collar 19a, secured to shaft 19, engage the bushing thrust faces thus limiting and resisting axial movement of the distributor. See Figure 4.

Brackets 30 are bolted to members 21, as at 31, and are provided with spare mounting holes 32 to permit the brackets to be moved transverse the axes of members 21 to three positions of adjustment. In addition, members 21 are provided with spare mounting holes 32a which are spaced uniformly from each other and from the mounting holes at 31 to permit brackets 30 to be moved parallel to members 21 to three additional positions of adjustment.

The adjustability of the brackets supporting the manure distributor is obviously highly advantageous, not only as an aid in adjusting the tension of chain 17, but also as a means of assuring that the shredded material supplied to the distributor by the pulverizer cylinders, impinges properly on the distributor.

A tapered supporting bracket 36, also having a more or less U-shaped cross section, is pivotally secured by a bolt, as at 37, to the structural member 21 adjacent sprocket 18. Bracket 36 is provided with a conventional arcuate adjusting slot 38 which is engaged by a bolt 39. In a well known manner, bolts 37 and 39 may be loosened to permit adjustment of the angular position of bracket 36 whereby an associated idler sprocket 40 is brought into engagement with chain 17 as an aid in adjusting the tension of the chain.

As shown in particular in Figure 3, sprocket 40 is rotatably secured to bracket 36 by means of a bolt 41 which clamps a short bearing sleeve 42 between a thrust washer 43 and the mounting bracket proper. A conventional lock washer 44 is provided to prevent loosening of the bolt.

From the foregoing disclosure it will be obvious that in accordance with this invention a very simple, rugged, cheap, removable supporting framework is provided for supporting a manure distributor at the rear of a manure spreader. Furthermore, it will be apparent that by means of the present invention, the distributor and its supporting framework may be easily and quickly removed to permit secondary uses of the manure spreader with obvious resulting advantages to farmers having diversified requirements for the spreader.

When the distributor assembly and framework have been removed from the manure spreader, it is possible to use the remaining portions as a wagon for conveying materials. When the spreader is so employed, the pulverizer cylinders are rendered inactive and straw or similar material is padded around the lower pulverizer cylinder to prevent loss of the material being conveyed from the rear of the wagon box. If materials of a relatively bulky nature are to be conveyed, the pulverizer cylinder itself may afford a sufficient barrier to prevent loss.

When the present invention is applied to a power driven manure spreader, the portions remaining after the removal of the distributor may be used as a wagon as hereinbefore described; however, the pulverizer cylinders and rearwardly moving conveyors may also be used in the usual manner to unload the wagon box at the desired destination. This is a highly desirable feature, particularly when the spreader is used to convey ensilage and similar amorphous materials. It is noteworthy that removal of the distributor does not effect the operation or utility of the conveyor and pulverizer cylinders in any way.

Having described our invention, we claim:

A removable framework and manure distributor installation, for use with a wagon box having conveying equipment adapting it for use as both a manure spreader and an ensilage carrier, comprising a rigid framework including spaced side frames, each side frame including upper and lower rigid members extending in a plane substantially perpendicular to the rear of the wagon box and converging at a point remote therefrom, each side frame also including a rigid vertical brace secured to said upper and lower rigid members, a transverse rigid strengthening member extending between corresponding points of said side frames for holding them in fixed lateral disposition, a rotary manure distributor, bearings secured to said side frames at the rear of said framework remote from the rear of the wagon box for supporting said distributor, a pair of brackets secured to the rear of the wagon box for supporting said framework, each bracket having a U-shaped configuration in horizontal cross section, said brackets being spaced laterally to receive the forward ends of said upper rigid members of said side frames, a transverse bolt through each of said brackets, the upper rigid member of each side frame having an open slot in its lower edge adjacent the forward end thereof in engagement with said bolts when said frames are positioned within said brackets, tightening of said bolts thereafter clamping said brackets against said side frames, and bolts engaging the forward ends of said lower rigid members for attaching them to the rear of the wagon box.

(References on following page)

References Cited in the file of this patent

UNITED STATES PATENTS

| Number | Name | Date |
|---|---|---|
| 789,254 | Campbell | May 9, 1905 |
| 804,003 | Francis | Nov. 7, 1905 |
| 971,837 | Fortin | Oct. 4, 1910 |
| 1,221,863 | Hunt | Apr. 10, 1917 |
| 1,764,956 | Hollinger | June 17, 1930 |
| 1,838,755 | Gamble | Dec. 29, 1931 |
| 2,015,245 | Swanson | Sept. 24, 1935 |
| 2,082,249 | Kirby | June 1, 1937 |
| 2,144,361 | Butter et al. | Jan. 17, 1939 |
| 2,256,815 | Raney et al. | Sept. 23, 1941 |
| 2,410,953 | Messenger et al. | Nov. 12, 1946 |
| 2,495,928 | Geraldson | Jan. 31, 1950 |
| 2,523,994 | McCloy | Sept. 26, 1950 |
| 2,619,885 | Beamer | Dec. 2, 1952 |
| 2,621,934 | Atkinson | Dec. 16, 1952 |